428-908.8 $$$ SR
4/3/84 XR 4,440,826

United States Patent [19]

Witman

[11] 4,440,826

[45] Apr. 3, 1984

[54] DECORATIVE SURFACE COVERING

[75] Inventor: Jack H. Witman, East Hempfield Township, Lancaster County, Pa.

[73] Assignee: Armstrong World Industries, Inc., Lancaster, Pa.

[21] Appl. No.: 460,126

[22] Filed: Jan. 24, 1983

[51] Int. Cl.[3] .............................................. B32B 27/14

[52] U.S. Cl. .................................. 428/327; 156/62.2; 156/298; 428/908.8

[58] Field of Search ............................ 428/908.8, 327; 156/62.2, 63, 298; 427/180

[56] References Cited

U.S. PATENT DOCUMENTS

| | | | |
|---|---|---|---|
| 2,867,263 | 1/1959 | Bartlett | 428/908.8 X |
| 2,888,975 | 6/1959 | Benedict | 156/298 |
| 2,936,814 | 5/1960 | Yakubik | 264/271.1 |
| 3,265,548 | 8/1966 | Harkins, Jr. et al. | 156/298 X |
| 3,360,414 | 12/1967 | Tuthill | 156/298 X |
| 3,682,741 | 8/1972 | Elliott et al. | 156/298 |
| 3,749,629 | 7/1973 | Andrews et al. | 428/908.8 X |
| 3,772,051 | 11/1973 | Shearing | 427/203 |
| 4,054,699 | 10/1977 | Brinkley | 428/908.8 X |
| 4,187,258 | 2/1980 | Simon | 428/458 X |
| 4,212,691 | 7/1980 | Potosky et al. | 156/62.2 X |

*Primary Examiner*—Henry F. Epstein
*Attorney, Agent, or Firm*—Laird F. Miller

[57] ABSTRACT

The present invention relates to a process of preparing decorative coverings whereby a pattern is optionally provided on a backing and is then covered with a layer of thermoplastic material. Translucent or transparent chips having a thickness dimension not less than the thickness of the layer of material are applied to the surface thereof, the mateial is warmed, and the structure is consolidated to push the chips down into the layer of material until they contact the underlying surface. By doing so, the material residing between the chips and the underlying surface is extruded from beneath the chips, resulting in a plurality of windows onto the underlying surface. Structures produced according to the present invention exhibit unique visual properties and are useful as floor coverings, wall coverings, and the like.

16 Claims, No Drawings

DECORATIVE SURFACE COVERING

The present invention relates to surface coverings and, more particularly, to surface coverings having decorative embedded-chip patterns.

BACKGROUND OF THE INVENTION

Decorative surface coverings are in wide use in the United States and throughout the world, and the producers of such covering are constantly attempting to produce new and varied visual appearances which are pleasing to consumers. Methods currently known in the art include the embedding of chips in a plastic matrix and/or the use of printed patterns to provide desired visual characteristics.

THE PRIOR ART

A number of U. S. patents relate to the production of decorative surface coverings utilizing chips or particles of material. For example, U. S. Pat. No. 2,867,263 discloses a method of producing a decorative covering by printing a pattern on a strippable backing, depositing malleable vinyl granules on the printed pattern and consolidating the granules. Upon heating, stripping the backing and laminating the structure onto a heavy backing, a structure comprising an encapsulated backing is produced. U. S. Pat. No. 2,888,975 discloses the use of flat pieces having a higher softening point than that of a matrix, the pieces being pressed into the matrix without distorting them. U. S. Pat. No. 2,936,814 discloses a method of consolidating chips into a plastisol by pushing cool chips into a relatively hot plastisol. The resulting structure is heated and treated such that particles on the surface are convex on the top, yet the edges of the particles are in the same plane as the surface of the plastisol. U. S. Pat. No. 3,265,548 discloses a process of placing a liquid resinous composition on a backing, depositing colored granules on the liquid, and fusing and planishing the resulting structure to provide a smooth surface without distortion of the granules. This reference also discloses a process of permitting the granules to sink by gravity into the liquid. U. S. Pat. No. 3,360,414 discloses a similar process whereby chips are used that preferably have the same composition as the liquid. U. S. Pat. No. 3,682,741 discloses the placing of chips on the surface of a plastisol and allowing the chips to sink; however, the chips remain near the surface. U. S. Pat. No. 3,749,629 discloses the dropping of decorative particles of material onto a tacky adhesive and covering the particles with a transparent liquid thermoplastic film such that the particles are visible in the resulting transparent layer. U. S. Pat. No. 4,212,691 discloses the depositing of chips on a wet plastisol using a rolling nip of chips and an inclined plane. The resulting structure having the chips adhered to the tacky surface is then consolidated under pressure.

Although these references disclose processes whereby interesting visual designs can be produced, none have been utilized to produce patterns in which the chips serve as windows onto an underlying pattern or backing.

Accordingly, one objective of the present invention is to provide visual patterns by which the chips reveal a background material lying therebeneath.

Yet another objective of the present invention is to provide visual characteristics whereby patterns are uniquely revealed through the use of overlying embedded translucent or transparent chips.

These and other advantages of the present invention will become apparent from the detailed description of preferred embodiments which follow.

SUMMARY OF THE INVENTION

The present invention relates to a process of preparing decorative coverings whereby a pattern is optionally provided on a backing and is then covered with a layer of thermoplastic material. Translucent or transparent chips having a thickness dimension not less than the thickness of the layer of material are applied to the surface thereof, the material is warmed, and the structure is consolidated to push the chips down into the layer of material until they contact the underlying surface. By doing so, the material residing between the chips and the underlying surface is extruded from beneath the chips, resulting in a plurality of windows onto the underlying surface. Structures produced according to the present invention exhibit unique visual properties and are useful as floor coverings, wall coverings, and the like.

DETAILED DESCRIPTION OF PREFERRED EMBODIMENTS

In one embodiment the present invention relates to a decorative surface covering comprising a backing material, optionally a design disposed on said backing material, and a thermoplastic coating material disposed on said backing having translucent or transparent chips embedded therein, the thickness of said coating material being not greater than the thickness of said chips, said chips being embedded such that said coating material is extruded from beneath said chips, thereby making said backing material and said optional pattern visible through said chips.

In a second embodiment, the present invention relates to a process for preparing a decorative surface covering, said process comprising the steps of selecting a backing material, optionally disposing a pattern on said backing material, coating said backing material with a thermoplastic coating composition having a thickness which is not greater than the thickness of subsequently applied chips, disposing translucent or transparent chips on the surface of said coating material, warming said thermoplastic material, and compressing said chips into said coating material to extrude said coating material from beneath the chips, thereby making said underlying backing material and said optional pattern visible through said chips.

Virtually any type of backing material may be used to practice the present invention. Preferably, the backing will be of a permanent type which becomes a permanent part of the structure. Alternatively, however, a temporary backing can be used as an anvil against which the chips would be compressed, thereby extruding the thermoplastic material from beneath the chips. Thereafter, the temporary backing can be removed and replaced with a permanent backing which optionally can have a pattern printed thereupon.

As yet another alternative, the present invention may be used in an inverse manner to produce a unique wear layer. For example, a clear coat which is the ultimate wear layer may be cast on a release carrier and covered with an appropriate thermoplastic material, after which the chips are embedded. When this structure is inverted, laminated to an appropriate substrate and separated from the release carrier, a product is obtained in which the substrate, which was attached last, is visible through the chips.

The thermoplastic coating material can be any type of material which is compatible with the backing and, if applicable, the wear surface. Typically it will soften at convenient working temperatures, such as 225° to 300° F. This material may be opaque or it may be translucent or transparent. Furthermore, it may be colored or uncolored, as desired by the artisan.

The coating material can be applied to the backing as a solvent composition from which the solvent is subsequently removed to provide a non-tacky thermoplastic material, or it can be applied as a hot-melt thermoplastic material which is then allowed to set by cooling. If a solvent solution is applied, it is usually applied at a wet thickness of about 2.5 to 8 mils which will yield a dry thickness that is preferably from about 1 to about 6 mils. Most preferred when using conventional chips, however, is a dry thickness in the range of from about 1.5 to about 4 mils, with the latter dimension being especially preferred.

The nature of the coating material will depend on the visual effect which is desired. If an opaque material is used, the backing material and the optional underlying pattern will be visible only through the chips, whereas if a translucent or transparent material is used, the backing material and optional pattern may be visible in one degree through the chips and in another degree through the colored material itself. Further, the visual pattern may be modified by applying the chips in a manner which coincides with an underlying pattern or in a random fashion.

The chips which are utilized should have a fairly uniform thickness which is not less than the dry thickness of the coating material. Uniformity is preferred to ensure that most of the chips are embedded such that they are in contact with the backing, and also to avoid the detrimental results that might occur if thicker chips were embedded such that they were pushed into the backing. Thicker chips can be used, however, if appropriate stops or adjustments are used during the embedding process.

If thin chips are used with a thick coating, they may become engulfed in the coating material such that the desired visual effect will be lost. Further, the greater the number of chips that is used, the thicker the chips should be in relation to the thickness of the coating. This is because the volume of the coating material will be increased as the chips become embedded. If these considerations are kept in mind, the present invention may be practiced with a variety of chip thicknesses, provided that for any given application the chips have a substantially uniform thickness.

Many types of clear or colored chips may be used to practice the present invention, including chips comprising organic or inorganic materials, provided that they are transparent or translucent. For example, quartz-filled vinyl chips have provided remarkable visuals, as have certain clear or colored vinyl plastic chips. The selection will usually be a matter of choice to the artisan, depending on the visual effect which is desired. However, as a note of caution, care should be exercised so as to avoid selecting chips which will be distorted when subjected to heat and pressure because it is preferable to have the chips maintain their shape so that the coating material surrounds the chips and assumes their shape during the embedding process.

The chips may be applied to the coating material in a variety of ways. Thus, the chips may be applied to a coating material which is in either a wet or a dry state. If applied in the dry state, which is preferable, the coating material will be applied and the solvent will be removed, if a solvent based coating material is applied. Alternatively, the coating material will be cooled if a hot-melt coating is used. In either event, the chips are applied to a non-tacky surface and treated depending upon the effect which is desired. For example, if the chips are intended to be maintained in a particular pattern, vibration would preferably not be used to level them; however, if a random chip pattern is applied, the substrate would preferably be vibrated so as to have the chips uniformly compacted and aligned. Thereafter, when the structure was warmed and compressed, the chips would be consolidated into the coating material until they contacted the back surface. In doing so the coating material would be extruded from beneath the chips, thereby exposing the backing and/or the optional pattern.

If the chips are applied to a wet coating material, they would immediately be adhered to the wet surface. However, application to a wet coating is not preferred because it is difficult to deposit the chips uniformly. Chips may tend to stand on edge and/or overlap so that, when they are embedded, they may be pushed into the backing. Although vibration may be useful to a degree to overcome these problems, the application of the chips to a dry surface is much preferred. Furthermore, essentially all of the solvent should be removed from the wet-applied material prior to embedding the chips.

Compression can be accomplished in any convenient manner, such as by using calender rolls or a flat-bed press. However, as indicated above, it may be desirable to control the depth of embedding to avoid pushing the chips into the backing and distorting an underlying pattern. This may be conveniently accomplished using appropriate stops on a press, or by substituting steel-over-rubber calender rolls for the conventional steel-over-steel rolls.

Directly contacting the chip/coating material combination with a roller or platen during the embedding step might cause adhesion of the coating material to the upper platen or roller. Accordingly, in such circumstances, the use of a release paper between the roller or platen and the coating material would be preferred. Of course, if the upper platen or roll is cold enough, adhesion of the coating material would probably not be a problem. Nevertheless, the use of a release paper will tend to give a smoother surface.

Once the chips are embedded the structure may be treated further, such as by applying a wear layer, embossing or the like, after which the structure would be fused to provide a final product.

EXAMPLES

The following examples are intended to illustrate, but not to limit, the scope of the present invention.

EXAMPLE 1

Onto a standard backing felt was applied approximately a 10-mil layer of white pigmented plastisol having the following composition.

| Ingredient | Parts by Weight |
|---|---|
| PVC homopolymer dispersion resin (Vinnol E79CS) | 80 |
| PVC homopolymer blending resin (Lucovyl PB-8015) | 20 |
| Dioctyl phthalate plasticizer | 17 |
| Phthalate plasticizer mixture (Santicizer 377) | 16 |
| Texanol isobutyrate plasticizer | 16 |
| Stabilizers | 7 |
| Triethylene glycol | 2 |
| Titanium dioxide pigment (1:1 dispersion in dioctyl phthalate) | 4.5 |

The coated felt was fused in an oven at 425° F. for two minutes, cooled and rotogravure printed with a rotogravure ink in a barber pole pattern. When the ink had dried, the pattern was overcoated with a black lacquer solution having the following composition. The coating was applied at a rate such that, when it had dried, the dry layer had a thickness of approximately 4 mils.

| Ingredient | Parts by Weight |
|---|---|
| Polyester resin (Arochem 642) | 100 |
| Phthalate plasticizer (Santicizer S-160) | 50 |
| Cellulose acetate butyrate (CAB-551-0.01) | 100 |
| Methyl methacrylate/n-butyl methacrylate copolymer (Elvacite 2013) | 100 |
| Black pigment (18% dispersion of pigment in dioctyl phthalate) | 7.5 |
| Solvent* | 200 |

*the solvent comprised 30% methyl ethyl ketone, 30% methyl iso-butyl ketone, 30% toluene and 10% cellosolve acetate.

The lacquer coated sheet was dried in an oven at low temperature for a sufficient time to remove the solvent, giving a non-tacky sheet.

To the sheet was applied, in a random fashion, clear vinyl chips having a thickness of about 10 to 12 mils. The sheet was vibrated to compact the chips, thereby providing essentially a single layer of chips. The sheet was passed over a hot platen heated to 250° F. with slight radiant heating from above, the heating dwell time being about 55 seconds. Heating caused the black coating material to become very soft. The sheet was covered with a release paper and passed into a pair of cold steel-over-steel calender rolls, thereby forcing the chips into the liquid and extruding the black material from beneath the chips as they contacted the printed pattern. The rolls were separated such that the chips were embedded only until they contacted the backing. The barber pole image became visible through the chips, as did a portion of the white background. Upon removal of the compressing force, approximately 4 mils of each chip protruded above the surface of the thermoplastic material.

The sheet was clear-coated with a vinyl plastisol having the same composition as the pigmented plastisol described above, the pigment being excluded from the clear coat. The coating was applied at a thickness of 4 mils and fused at 450° F. for 2 minutes to yield a clear coated sheet having a unique visual appearance.

EXAMPLE 2

Several pigmented thermoplastic lacquer compositions were prepared using the following components:

| Component | Parts by Weight 2a | 2b | 2c |
|---|---|---|---|
| Cellulose acetate butyrate (CAB-551-0.01) | 100 | 90 | 240 |
| Acrylic copolymer (Elvacite 2013) | 120 | 90 | 240 |
| Polyester resin (Arochem 642) | 120 | — | — |
| Alpha-methyl styrene polymer (Amoco 18-210) | — | 90 | 240 |
| Phthalate plasticizer (Santicizer S-160) | 60 | 15 | 80 |
| Pigment dispersion (white) | — | 30 | — |
| Pigment dispersion (black) | 30 | — | — |
| Pigment dispersion (blue) | — | 10 | — |
| Pigment dispersion (green) | — | — | 35 |
| Solvent | 327 | 377 | 869 |
| Total Solids (%) | 56.8 | 46.2 | 49.0 |
| Viscosity (#4 Zahn cup; seconds) | 35 | 41 | 39 |

The black pigment dispersion comprised 18% pigment by weight in dioctyl phthalate, whereas the blue, green and white dispersions comprised about 45-50% pigment in the same plasticizer. The solvent was the same as that described in Example 1.

Each of these lacquer compositions was coated onto separate samples of the printed backing felt described in Example 1 using the techniques disclosed in that example to provide 4-mil coatings of thermoplastic material after evaporation of the solvent. Quartz-filled vinyl chips having a thickness of about 5 mils were then embedded in each material and a clear coat was provided as previously described. The resulting structures showed the underlying pattern through the quartz chips.

EXAMPLE 3

This example will illustrate hot-melt compositions which serve as the embedding materials.

| Composition | Parts by Weight 3a | 3b |
|---|---|---|
| Cellulose acetate butyrate (CAB-551-0.01) | 150 | 150 |
| Acrylic copolymer (Elvacite 2013) | 150 | 150 |
| Polyester resin (Arochem 642) | 150 | 150 |
| Phthalate plasticizer (Santicizer S-160) | 75 | 75 |
| Pigment dispersion (black) | 7.5 | — |
| Pigment dispersion (white) | — | 35 |

These compositions were heated to 235–280° F. applied as a 4-mil coating to the printed felt described in Example 1, and then cooled to solidify the resin. The chips were embedded essentially as described in the previous examples to give comparable products.

EXAMPLE 4

This example will illustrate an inverse-type preparation of an embedded product wherein the embedding is achieved using the wear layer as the support surface, with subsequent inversion and lamination to a permanent support.

A 4-mil coating of the clear coat described in Example 1 was disposed on a commercially available sample of SD Warren P-202 Paper, which is coated with Quilon chrome complex release coating. The wet coating was fused at 425° F. for two minutes,cooled and the black lacquer material described in Example 1 was applied as described in that example and dried.

Chip embedding was accomplished as described in Example 1, after which the combined material was laminated with a backing material coated with a thin layer (ca. 0.5 mil) of adhesive lacquer. The adhesive lacquer comprised the following components.

| Component | Parts by Weight |
| --- | --- |
| Polymethyl methacrylate (Acryloid A-11) | 20.4 |
| Toluol | 58.2 |
| Methyl ethyl ketone | 21.4 |
| Phthalate plasticizer (Santicizer S-160) | 6.0 |

The adhesive lacquer was applied to the backing material and dried for 15 seconds in an oven at 250° F. The coated backing was then inverted and interfaced with the chip sheet such that the chip sheet, on the bottom, contacted the adhesive lacquer. The interfaced sheets were placed in a flat bed press and preheated without pressure for 53 seconds with the bottom platen at 250° F. The materials were then compressed at 500 lbs. gauge pressure using a cold top platen for ten seconds. Pressure was discontinued, the laminated material was removed from the press and the release coating was stripped from the structure while hot. The resulting product had embedded chips through which the backing material could be viewed.

The present invention is not limited solely to the descriptions and illustrations provided above, but encompasses all modifications envisaged by the following claims.

What is claimed is:

1. A decorative surface covering comprising
 a backing material,
 optionally a design disposed on said backing material, and
 a thermoplastic coating material disposed on said backing material having translucent or transparent chips embedded therein, the dry thickness of said coating material being not greater than the thickness of said chips, said chips being embedded such that said coating material is extruded from beneath said chips, thereby making said backing material and said optional pattern visible through said chips.

2. The invention as set forth in claim 1 hereof wherein the dry thickness of said thermoplastic coating material varies from about 1 to about 6 mils.

3. The invention as set forth in claim 2 hereof wherein said thickness varies from about 1.5 to about 4 mils.

4. The invention as set forth in claim 1 hereof wherein said chips are vinyl chips.

5. The invention as set forth in claim 1 hereof wherein said chips are quartz-filled vinyl chips.

6. A process for preparing a decorative surface covering, said process comprising the steps of
 selecting a backing material,
 optionally disposing a pattern on said backing material,
 coating said backing material with a thermoplastic coating composition having a dry thickness which is not greater than the thickness of subsequently applied chips,
 disposing translucent or transparent chips on the surface of said coating material,
 warming said thermoplastic material, and
 compressing said chips into said coating material to extrude said coating material from beneath said chips, thereby making said underlying backing material and said optional pattern visible through said chips.

7. The invention as set forth in claim 6 hereof wherein the dry thickness of said thermoplastic coating material varies from about 1 to about 6 mils.

8. The invention as set forth in claim 7 hereof wherein said thickness varies from about 1.5 to about 4 mils.

9. The invention as set forth in claim 6 hereof wherein said coating material is solvent based.

10. The invention as set forth in claim 6 hereof wherein said coating material is a hot melt thermoplastic material.

11. The invention as set forth in claim 7 hereof wherein said coating material is solvent based.

12. The invention as set forth in claim 7 hereof wherein said coating material is a hot melt thermoplastic material.

13. The invention as set forth in claim 8 hereof wherein said coating material is solvent based.

14. The invention as set forth in claim 8 hereof wherein said coating material is a hot melt thermoplastic material.

15. The invention as set forth in claim 6 hereof wherein said chips are vinyl chips.

16. The invention as set forth in claim 6 hereof wherein said chips are quartz-filled vinyl chips.

* * * * *